(12) United States Patent
Templeman (10) Patent No.: US 7,542,040 B2
(45) Date of Patent: Jun. 2, 2009

(54) SIMULATED LOCOMOTION METHOD AND APPARATUS

(75) Inventor: James N. Templeman, Springfield, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 584 days.

(21) Appl. No.: 11/203,588

(22) Filed: Aug. 11, 2005

(65) Prior Publication Data

US 2007/0003915 A1    Jan. 4, 2007

Related U.S. Application Data

(60) Provisional application No. 60/603,517, filed on Aug. 11, 2004.

(51) Int. Cl.
*G06T 15/70* (2006.01)
(52) U.S. Cl. ............................................. 345/474
(58) Field of Classification Search ................ None
See application file for complete search history.

(56) References Cited

U.S. PATENT DOCUMENTS

| | | | |
|---|---|---|---|
| 5,148,152 A * | 9/1992 | Stueckle et al. .............. 345/156 |
| 5,184,319 A * | 2/1993 | Kramer .......................... 703/5 |
| D339,612 S * | 9/1993 | Carter et al. ................ D14/419 |
| 5,436,638 A * | 7/1995 | Bolas et al. ................. 345/156 |
| 5,524,637 A * | 6/1996 | Erickson ..................... 600/592 |
| 5,551,701 A * | 9/1996 | Bouton et al. ................. 463/36 |
| 5,552,807 A * | 9/1996 | Hayes et al. ................ 345/156 |
| 5,563,988 A * | 10/1996 | Maes et al. ................. 345/421 |
| 5,592,401 A * | 1/1997 | Kramer ....................... 702/153 |
| 5,610,631 A * | 3/1997 | Bouton et al. ............... 345/161 |
| 5,701,140 A * | 12/1997 | Rosenberg et al. .......... 345/156 |
| 5,825,308 A * | 10/1998 | Rosenberg .................... 341/20 |
| 5,838,305 A * | 11/1998 | Bookstein ................... 345/163 |

(Continued)

OTHER PUBLICATIONS

Bouguila et al. Realizing a New Step-in-place Locomotion Interface for Virtual Environments with Large Display System. Proceedings of the Workshop on Virtual Environments. 2002.*

(Continued)

*Primary Examiner*—Peter-Anthony Pappas
(74) *Attorney, Agent, or Firm*—John J. Karasek; L. George Legg (57) ABSTRACT

An apparatus for interfacing 3D movements of a user to control the locomotion of an avatar in a virtual environment includes a position tracker for tracking the position of a user's feet, with the foot motions including swinging and stroking; a computer programmed for (i) computing a direction and extent of motion of a reference in the virtual environment based on the foot positions and (ii) providing an avatar corresponding to the computed direction and extent of motion; and a display for displaying the avatar in the virtual environment. The apparatus accordingly uses the gestural motion of the user's feet while seated to simulate natural human locomotion. The gestural motions of stroking and swinging include translational and rotating movements, and are chosen to correspond to the actions of the feet and legs during natural human locomotion, providing natural control of virtual locomotion. The apparatus is also designed for controlling the locomotion of a remote vehicle.

21 Claims, 3 Drawing Sheets

U.S. PATENT DOCUMENTS

| | | | |
|---|---|---|---|
| 5,841,426 A * | 11/1998 | Dodson et al. | 345/163 |
| 5,864,333 A * | 1/1999 | O'Heir | 345/157 |
| 5,907,318 A * | 5/1999 | Medina | 345/163 |
| 5,913,727 A * | 6/1999 | Ahdoot | 463/39 |
| 5,930,741 A * | 7/1999 | Kramer | 702/153 |
| 6,008,797 A * | 12/1999 | Sanderson et al. | 345/156 |
| 6,028,593 A * | 2/2000 | Rosenberg et al. | 345/156 |
| 6,070,269 A * | 6/2000 | Tardif et al. | 2/69 |
| 6,132,313 A * | 10/2000 | Yamaguchi | 463/36 |
| 6,366,272 B1 * | 4/2002 | Rosenberg et al. | 345/156 |
| 6,380,925 B1 * | 4/2002 | Martin et al. | 345/161 |
| 6,646,643 B2 * | 11/2003 | Templeman | 345/473 |
| 6,681,031 B2 * | 1/2004 | Cohen et al. | 382/103 |
| 6,980,133 B2 * | 12/2005 | Foong | 341/20 |
| 7,158,112 B2 * | 1/2007 | Rosenberg et al. | 345/156 |
| 7,372,453 B2 * | 5/2008 | Blish et al. | 345/163 |
| 2002/0036617 A1 * | 3/2002 | Pryor | 345/156 |
| 2002/0089506 A1 * | 7/2002 | Templeman | 345/473 |
| 2003/0063093 A1 * | 4/2003 | Howard et al. | 345/581 |

OTHER PUBLICATIONS

Darken et al. The Omni-Directional Treadmill: A Locomotion Device for Virtual Worlds. Proceedings of the 10th annual ACM Symposium on User Interface Software and Technology. 1997.*

Iwata. The Torus Treadmill: Realizing Locomotion in VEs. IEEE Computer Graphics and Applications. vol. 19. Issue 6. Nov. 1999.*

Templeman. Virtual Locomotion: Walking in Place through Virtual Environments. Presence. vol. 8. No. 6. Dec. 1999.*

Iwata. Walking About Virtual Environments on an Infinite Floor. Proceedings of the IEEE Virtual Reality. 1999.*

* cited by examiner

User's Physical Body

SIMULATED LOCOMOTION METHOD AND APPARATUS

The present application claims the benefit of the priority filing date of provisional patent application No. 60/603,517, filed Aug. 11, 2004, incorporated herein by reference.

FIELD OF THE INVENTION

The present invention relates generally to a method and apparatus for interfacing gestural 3D movements of a user to the locomotion of a reference in a virtual or remote environment. In particular, the present invention relates to such a method and apparatus where a user can simulate motion through a virtual environment while seated. The invention also relates to user control of a remote vehicle.

BACKGROUND OF THE INVENTION

A virtual environment is an array of sensory cues generated in response to a user's actions that gives the user the impression of dealing directly with a three dimensional model. Typically either a head mounted display or a surround screen display is used to present a dynamic perspective image of the visual environment as the user moves within it. The virtual environment may be synthetically generated within a computer or may involve sensory input from a remote physical location (as in tele-operations). Virtual locomotion is movement over long distances in a virtual environment which is controlled by a user remaining within a relatively small physical space.

Virtual locomotion can be used for a variety of purposes, such as: training or rehearsal in executing skills, tasks, strategies and navigation that involve moving through an environment on foot; planning activities that involve moving through a target environment; evaluating the ergonomics or aesthetics of structures designed for human habitation, or of devices intended for mobile operation; piloting remote surface vehicles; communications between people at different locations when they want to relate to each other in a way that involves locomotion; and entertainment experiences that involve moving through a virtual environment. Particular applications would include training people to perform hazardous tasks without risking bodily harm or to train soldiers in combat simulators where the soldier interacts directly with the surrounding environment which includes other members of a team.

Head based steering is widely used in virtual environment systems. It is economical because the same position tracker used to determine the user's field of view is also used to control the direction of motion. Head based steering also encourages the user to look where they are going, and the hands are free for manipulation. However, looking and moving are no longer independent, so that the user cannot turn their head to look to the side while moving without altering their path. This makes it difficult to move to a desired position in the virtual environment.

Hand based steering techniques are also widely used and determine direction either from where the arm is pointed, from where a hand-grip is pointed, or from where a finger is pointed. Hand based steering thus frees the head for looking and allows the user to move sideways relative to the head or body. However, the control mechanism interferes with manipulation, so that the hand cannot be used for other, more normal tasks. In addition, the user must remain aware of the significance of where the hand is pointed at all times.

Torso based steering frees the head for looking and the hands for manipulation, but it does not support sidestepping. While a person in the real world will typically move in the direction that the front of the torso is pointing, sometimes this is not the case. For example, a soldier aiming a rifle across his chest may prefer to advance in the direction that he is aiming.

Another steering technique is lean based steering, which has three approaches: tilting of the upper torso, shifting of weight relative to the feet, and shifting of weight relative to a platform. All three approaches provide hands-free operation and can support sidestepping. However, the tilting of the torso approach precludes the user tilting for other purposes. The shifting of weight approach, where weight is shifted relative to the feet, is of limited use because a user cannot pace to turn.

The shifting of weight relative to a platform approach is controlled by moving the body of the user locally, relative to a central neutral position. However, when using a head-mounted display, the user easily loses track of where he stands with respect to the neutral position although the direction and rate of optical flow provides one indication of where the user is situated. A set of elastic straps attached to a ring around the user's waist gives haptic feedback, pushing the user back towards the neutral position. However, with the directional coordinate frame relative to a fixed external point in space, this is an unnatural condition that makes turning of the body and controlling the direction of motion even more independent than they are with natural locomotion. For example, the user may choose to move in one direction and then turn to face in another, making it as easy to move backwards as forwards. This approach is also incompatible with physical locomotion because velocity is controlled by the relative position of the body.

Speed of movement in a virtual environment can be controlled by using finger pressure for hand based systems, by the degree of leaning for lean based systems, by the rate at which a user paces in place, or by the degree of leg movement when the user paces in place. Often a pair of binary switches attached to a hand control are used to invoke either forward or backward virtual motion. This widely used technique is easy and inexpensive to implement. The use of such hand controls is advantageous as they work independently of head, torso and leg movements, and are thus compatible with a wide range of physical motions. However, use of hand controls for speed interferes with use of the fingers for manipulative tasks which are becoming more desired and common, especially in combat systems where the user needs to hold and aim a weapon. Another disadvantage is that when head-mounted displays are used, the user cannot see his hands or how the fingers touch the buttons, limiting the number of buttons the user can deal with.

Another speed control system was based on detecting the gesture of walking in place. A six degree of freedom magnetic sensor was attached to a head mounted display in order to track the user's head motion so that a computer could recognize walking in place versus other activity such as turning one's head or bending at the waist. Head based steering was also used so that the head tracker fully controlled virtual locomotion. While useful, this system did not allow a user to walk in one direction and look in another direction.

A number of mechanical systems have also been disclosed. One such system uses the sliding motion of the feet to indicate walking. In this system, the user wears sandals with low friction film on the middle of their sole and a rubber brake pad at the toe. The user thus glides on a low friction surface by pushing their waist against a hoop -that surrounds the user and sliding his feet. A position tracker attached to each ankle and contact sensors on the bottom of each foot allow the system to recognize the length and direction of each pace and hence to specify movement in the virtual environment. However, the placement of a hoop at waist level does not allow a user to hold an object such as a rifle by their side.

Another mechanical system utilizes an omni-directional treadmill and allows the user to walk in any direction. The treadmill consists of a pair of conveyor belts nested one insider the other, with each belt mounted horizontally and perpendicular to each other. The outer belt has rollers so that it can transmit the motion produced by the inner belt, so that motion in any horizontal direction can be made. An associated control is used to keep the user centered in the middle of the platform. This system allows a user to walk in a straight line in any direction and to accelerate in that direction. However, turning while accelerating can lead to a misalignment between the user's direction of translation and the centering motion of the controller, causing a loss of balance. Even turning in place can be difficult because the controller registers the motion and compensates for it by moving the surface under the user's feet. Another problem is that a user can decelerate very quickly, coming to a full stop in a single pace or by redirecting their motion while walking fast. The user normally perceives linear and angular acceleration using their vestibular system, which leads to perceptual conflicts when using this system and which thus makes its use difficult.

A foot based locomotion system has been developed by the Army Research Institute in Orlando, Fla. Forward virtual motion is triggered by the lifting of the foot above a vertical threshold. Steering is effected by the horizontal orientation of a magnetic tracker worn on the back of the user between the shoulder blades. Thus, the user is able to effect virtual displacement while turning in place. To move backwards, one foot is placed or slid behind the other a predefined distance, with both feet flat on the floor. However, this system is disadvantageous as it does not allow use of a normal pace or gait, or of a side pace.

A gestural pace-based sensing system as described in U.S. Pat. No. 6,646,643, James N. Templeman, issued Nov. 11, 2003, and incorporated herein by reference, employs sensors positioned on a user's legs, e.g. the knees, with the user standing, with gestural pacing being the primary mechanism by which virtual motion takes place. Although the system is an improvement over alternative systems, it requires the user to be in a standing position for optimal performance.

It would be desirable to have a system for the realistic simulation of walking around in a virtual environment that operates effectively while a user is seated.

BRIEF SUMMARY OF THE INVENTION

An apparatus for interfacing 3D movements of a user to control the locomotion of an avatar in a virtual environment includes a position tracker for tracking the position of a user's feet, with the foot motions including swinging and stroking; a computer programmed for (i) computing a direction and extent of motion of a reference in the virtual environment based on the foot positions and (ii) providing an avatar corresponding to the computed direction and extent of motion; and a display for displaying the avatar in the virtual environment. The apparatus accordingly uses the gestural motion of the user's feet while seated to simulate natural human locomotion. The gestural motions of stroking and swinging include translational and rotating movements, and are chosen to correspond to the actions of the feet and legs during natural human locomotion. This correspondence makes the control easier and more natural to use than other forms of seated virtual locomotion control. The user can control the timing, rate, extent, and direction of the translation of the user viewpoint. The user can also turn the virtual body, or alternatively a remotely controlled vehicle, by either twisting the feet, stroking one or both feet when both feet are down, or turning while seated. Using only the feet to control virtual locomotion frees the hands, head, and the rest of the upper body to perform other tasks in coordination with virtual locomotion. The ability to control a wide range of natural motions in a manner that closely matches natural human locomotion sets this control apart from other virtual locomotion controls. This control can be used with a wide variety of different tracking and display systems.

It is an advantage that the equipment needed for the apparatus is relatively compact (compared to other systems) and potentially inexpensive. The present invention, having the user seated and turning 180 degrees rather than a full 360 degrees, significantly reduces the footprint and hence the size of the training station compared to other VE systems such as those requiring the user to be standing and walking. A seated user also reduces the vertical extent of the space that needs to be tracked, further decreasing the system's footprint and overall size because the tracking or position sensors can be positioned within a more confined space.

The present invention further provides facile, natural control over both turning and translating through a virtual environment (VE).

Other features, objects and advantages of the present invention are stated in or apparent from detailed descriptions of presently preferred embodiments of the invention found hereinbelow.

DETAILED DESCRIPTION OF THE INVENTION

DEFINITION(S): The term "tracker" as used herein includes the following: A tracking system made up of a set of components that allow a position detector to determine one or more of the spatial coordinates (X, Y, Z, Yaw, Pitch, Roll) of one or more tracked elements (e.g., parts of the body). Many tracking systems require the attachment of one or more tracking components to the tracked element. A "sensor" is a device that registers specific forms of structured energy. Position detectors take in readings from one or more sensors to determine the coordinates of tracked elements. In the case of a conventional optical tracking system, a set of markers is attached to the element to be tracked, visible to optical sensors mounted in the room. Other tracking technologies, including acoustic and potentially RF tracking, may adopt a similar configuration. One or more emitting or reflective elements for the sensed form of transmitted energy is attached to the tracked element and sensors are placed in the room. Another configuration is to place the sensor(s) on the element to be tracked and place emitting or reflective elements as points of reference in the room. Some sensors can detect their own motion without the need for reference markers: Inertial sensors can register translational or rotational accelerations which can be integrated (twice) over time to determine translational or rotational displacements. Inclinometers use the earth's gravity to sense tilt. Magnotometers can register their orientation with respect to the earth's magnetic field. Such sensors are mounted directly on the tracked element. Another approach is to use optical sensors to track with, but to use the natural visual features as reference points, instead of applying a special set of markers (emitters or reflectors). In that case the optical sensors could either be mounted in the room with the receiving aperture directed towards the tracked element, or the optical sensors could be mounted on the tracked element and look for visual features of surrounding room to sense its own motion. A tracker can also employ instrumented mechanical linkages to connect the tracked element to a known frame of reference. The change in the relative positions of the linkages are sensed and those readings are fed into a position detector.

Figure 1:
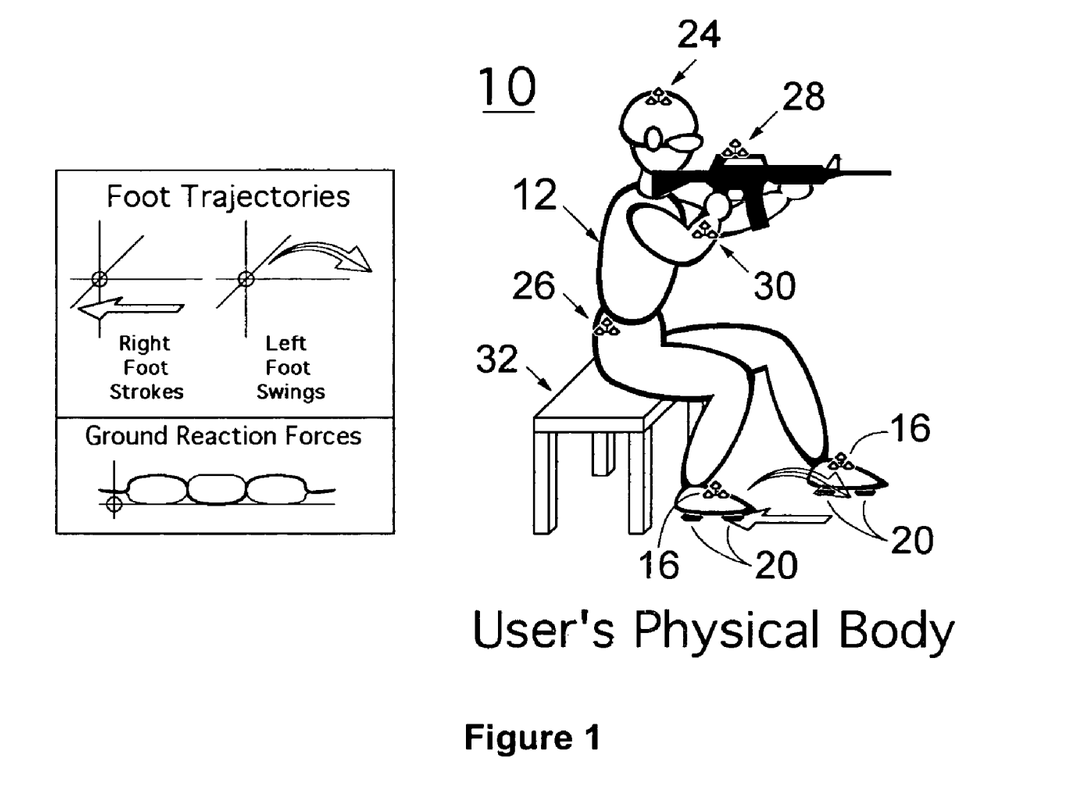
FIG. 1 is a schematic representation showing the positioning of sensors on a user and representative movements and forces according to the invention.
Figure 2:
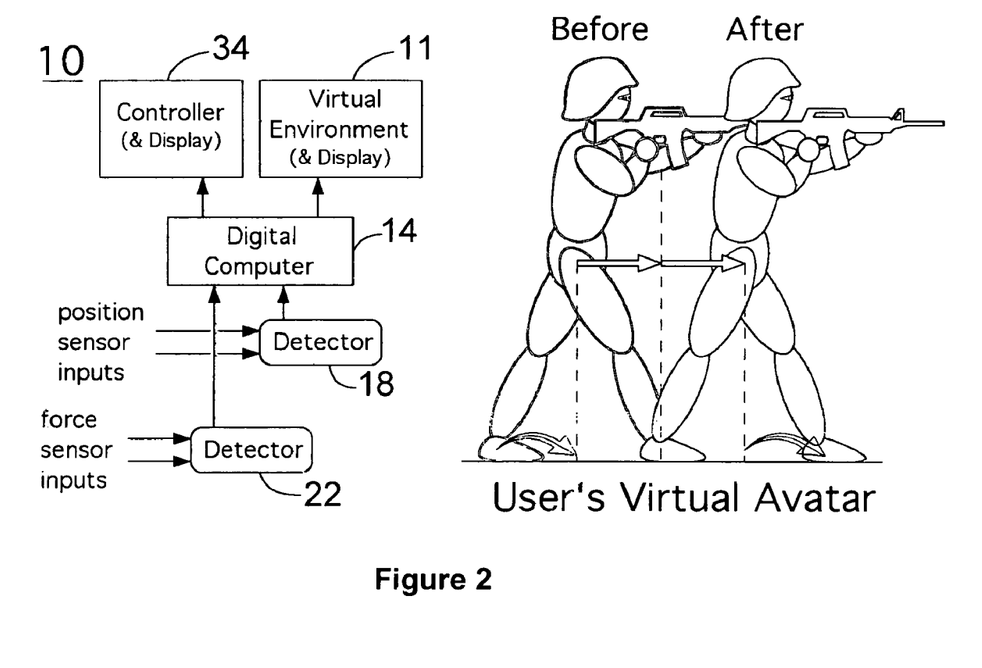
FIG. 2 is a schematic representation of a system and a virtual environment view of a user's avatar undergoing locomotion controlled by the invention.

With reference now to the drawing in which like numbers represent like elements, the apparatus 10 for interfacing locomotive 3D movements of a user 12 to a reference (or reference-point, point-of correspondence, virtual-reference-point, motion-control-point, etc.) in a display 11 of a virtual environment (see FIG. 2) is schematically illustrated in FIG. 1. It will be appreciated that the term virtual environment is used hereafter to refer both to a computer or the like generated virtual environment as well as to an actual environment which is remotely displayed to the user (as in the case of a vehicle operated remotely by a user). It will also be appreciated that the term "pace" is used herein to refer to a what is more commonly referred to as a "step" or the like, including walking and running steps, so as to avoid confusion with the "steps" (actions) of the method of the invention.

The term "a reference" as used herein, e.g. "a reference in a virtual environment or remote environment", means a position, e.g. a virtual spatial location definable by x-y-z-type 3D coordinates within a virtual environment, establishing an associated alignment in the virtual environment related to a user's physical motions as are further described herein. The virtual environment reference may be associated with different physical spatial parameters, including but not limited to a user's viewpoint, a part of a user's body or depiction thereof, or an object depicted in the virtual environment, such as a rifle, which may be associated with a physical prop that itself may be motion-tracked. The term "a reference", however, does not in every instance require a physical counterpart, since an object, e.g. a hand grenade, can be simulated, such as with a user simulating holding the grenade or other object without actually holding a physical prop. More than one "reference" may be maintained and applied by the system at the same time, as is the case when several different parts of the user's body are tracked and represented in virtual environment.

In performing the method of the present invention, it will be appreciated that the control technique is divided into two parts: the control action made by user 12 and the controlled effect (of the control action) produced by a computer 14 in the virtual environment. Since the control technique is used to mimic an action performed in the real world, there is a corresponding natural action and natural effect. For virtual locomotion, the natural action is perambulation (walking, running, sidestepping, etc.), the natural effect is real motion (physical displacement), the control action will involve the gestural motion of the user's feet and the controlled effect is virtual motion. In addition, locomotion control is divided into two components: control over the direction of motion (steering) and the rate of motion (speed control). With natural locomotion, steering is achieved by (a) displacing the body in any direction relative to the body's (pelvic girdle) orientation (e.g., forward, side or back pacing), (b) turning the body, or (c) a combination of displacing and turning.

It will also be appreciated that the present invention is designed to provide a control for maneuvering through virtual environments in a natural manner. In particular, this object is achieved by (a) having the control action be similar to the natural action of the user with respect to the action's intrinsic properties (parts of the body involved in motion, constraints on movements, etc.), (b) having the components of the control action interact with each other in the same ways the components (steering and speed control) of the natural locomotion interact, (c) having the control action interact with other actions (looking (directing both the head and eyes), manipulation (typically involving the hands, such as when a rifle is pointed), posturing (moving of body parts for other than looking, manipulation and locomotion), and thinking (i.e., cognitive load) in a manner similar to the way natural locomotion interacts with other actions (e.g., freeing the hands for manipulation and allowing a normal level of coordinated head, arm, and leg movements), and (d) having the control effect be similar to the natural effect (i.e., the rate and precision of movement should match).

It will further be appreciated that the present invention is designed to provide a great deal of compatibility with other natural actions by having the user's upper body directly control the avatar's upper body. This allows actions like turning the head, pointing the hand, or wielding a weapon to be performed as a natural coordinated motion. It also allows the reflexive orientation of a person's head towards or away from a stimulus to be used effectively (e.g., turning one's head to view a source of an unexpected sound).

The present invention also allows other sorts of postural movements like bending the upper body forward or to the side at the waist. Such actions may be performed as the user executes virtual locomotion.

The goal is to use a person's leg motions to provide a similar level of facility at controlling one's virtual movements as is achieved with natural locomotion. It is desirable to use a person's legs to control virtual locomotion because: (1) The legs are involved in natural walking and running. (2) People are accustomed to move their legs in certain rhythmical patterns and if the gestural motions bear a similarity to these patterns people may more readily adopt them and use them to express corresponding motions. (3) Using the feet frees up the use of other parts of the body to interact with other aspects of the VE. The hands may be used for manipulation and to express non-verbal communication, the head can freely turn to face and view objects without altering the trajectory of a person's virtual locomotion. As a result, as user 12 swings and strokes their feet over the floor, while seated, the reference in the virtual environment walks or moves similarly in the virtual environment. The representation of the user's virtual or remote "body" is termed its "avatar").

Referring now to FIG. 1, virtual motion is controlled by gesturing with the feet. The user interface apparatus 10 uses the motion of the feet, moving both above in contact with the floor, to control the virtual movement. The invention preferably employs a hybrid sensor system. Foot position trackers (tracking sensors or sets of tracking markers) 16 are positioned on (or located or directed at) the feet of user 12 to register foot motion. Preferably, optical tracking systems are employed to report the position and orientation of the user's feet. Accordingly, position trackers 16 in one embodiment are light-emitting diodes, which may be attached to each piece of footwear, e.g. each sandal of a pair of sandals, and tracked by a suitable detector 18, e.g. an optical tracker such as the PhaseSpace PS active optical tracker manufactured by PhaseSpace, Inc. Different kinds of tracking systems may be employed in this capacity: For example, retro-reflective markers attached to the sandals tracked by the Vicon 524 Real Time motion capture system manufactured by Vicon Motion Systems can be used to perform passive optical tracking of the feet's motion. Such tracking systems provide dynamic, real time six degree-of-freedom measurement: X, Y, and Z position and yaw, pitch, and roll orientation, in real time.

The position trackers 16 alone may not provide a sufficiently precise indication of when each foot makes contact with the floor, therefore additional force sensors 20 are preferably positioned on the respective ball and heel of each foot to register ground reaction forces. The force sensors 20 help determine the state of each foot at any point in time, distinguishing between a raised foot and a foot making contact with the floor. Force sensors 20 in one embodiment are force sensing resistors for measuring the distribution of force under each foot. A force threshold is set, on an individual basis for each sensor 20, to indicate when contact is made between the foot and the floor.

A detector 22 receives the force outputs from force sensors 20 to determine when a pace begins and ends. Then, the direction and extent of the foot motion is made using detector 18 and trackers 16. Computer 14 processes the detected characteristics with pattern recognition software as further described below to compute a direction and extent of virtual displacement occurring over the course of the gestural stroke or swing of each foot. The computed results are then used to move the reference in the virtual environment.

The pattern recognition software logic is programmed in computer 14, which preferably includes a computer readable medium for storing the instructions which when executed by the computer processor causes the computer 14 to implement the pattern recognition logic; the logic is used as described below in more detail to distinguish between translation and rotation of a raised foot versus the translation and rotation of a foot in contact with the floor, and combinations of these control actions. The software logic recognizes gestural motions of the feet of user 12 to move the reference in the virtual environment, enabling the user to remain seated while moving in the virtual environment.

Again, it is noted and reiterated that the invention employs two-footed control over virtual locomotion when the user 12 is seated. The depiction of a person's body in a virtual environment is called their avatar. The invention provides a variety of ways to translate and to turn the user's avatar. The avatar can be translated by (1) translating a foot in contact with the floor while the other foot is raised, and (2) by translating a raised foot. The avatar can be turned by (1) twisting a foot in contact with the floor while the other foot is raised, (2) by twisting a raised foot or (3) by translating one or both feet when both are in contact with the floor (thus rotating the positions of the feet relative to each other).

Virtual locomotion moves the user's viewpoint in the VE while the user remains localized in the real world. These physical actions can be used to move the person's viewpoint through a virtual environment and to control the movements of their avatar as they move through a virtual environment.

A seated user swings and strokes his feet across the floor to control the movement of his avatar through VE. A foot "strokes" when it is translated and/or rotated while in contact with the floor. A foot "swings" when it translate and/or rotates above the floor without making contact. Translation of the avatar is indicated by translating the feet while stroking across or swinging over the floor.

The control technique affords a direct mapping, of the actions performed in stroking and swinging the feet while seated, to the support and swing actions the legs perform during natural locomotion. The correspondence of seated foot gestures with the states and actions associated with natural walking and running gaits is as follows.

Both natural walking and running gaits are characterized in terms of a cyclical alternation between having one leg supporting the user's body while the other is free to swing out to a new location. A correspondence is established between the user's physical legs and the legs of his avatar to simulate natural locomotion. The avatar's foot is in contact with the virtual ground if the corresponding physical foot contacts the floor and the avatar's foot is raised above the surface of the virtual ground if the corresponding physical foot is raised above the floor. Thus a foot of the seated user making contact with the floor corresponds to a foot providing support to the standing figure. A raised foot of the seated user corresponds to the raised foot of the standing figure free to move to a new position.

A normal cyclical walking gait is expressed with the seated control as follows: the foot remaining in contact with the floor corresponds to the support foot in natural walking. The stroking of the foot in contact with the floor corresponds to the backward movement of the support foot relative to the avatar's pelvis. The other, raised foot swinging out to a new location corresponds to the foot of the avatar's swing leg. The user can take virtual steps in any direction (e.g., forward, backward, sideway, or diagonal) by controlling the direction of the swing and stroke gestures. The correspondence with natural gait applies not only to basic walking steps, but also stepping to turn, pivoting on two feet, jumping, and even kicking and raising one's feet to clear trip hazards. Therefore this control technique shares many of the properties of natural locomotion: body relative coordinate system, open-loop control, measured extents of motion, and two-footed operation where one foot is repositioned while the other propels the body. When a raised foot moves, the avatar foot corresponding to it moves in synchrony with it, while the avatar's pelvis (and upper body) moves in the same direction. This corresponds to propelling the body in the direction in which the swing leg moves as typically occurs in natural walking.

$\Delta d$(Avatar Support Foot)=0

$\Delta d$(Avatar Swing Foot)=$S*\Delta d$(Raised Foot)

$\Delta d$(Avatar Pelvis)=½$*S*\Delta d$(Raised Foot)

$\Delta d$ (segment) represents a displacement vector in the horizontal plane of motion for the part of the user's physical or avatar body included between the parenthesis. S represents a scale factor that scales the displacement of the user's foot movement to the displacement of the avatar's foot. S may vary with user, direction of motion, and to achieve other effects (see below). When a single foot of the seated user is in contact with the floor and that foot strokes in one direction the corresponding foot of the avatar remains stationary while the avatar's pelvis moves away from that foot in the opposite direction.

$\Delta d$(Avatar Support Foot)=0

$\Delta d$(Avatar Swing Foot)=$-S*\Delta d$(Stroking Foot)

$\Delta d$(Avatar Pelvis)=$-½*S*\Delta d$(Stroking Foot)

The reason for moving the avatar's pelvis in the opposite direction to which the foot is stroked is as follows: just as the support foot "moves" in the opposite direction relative to the pelvis in natural walking, so the stroking foot moves in the opposite direction relative to the avatar's pelvis. The net effect in both cases is a displacement of the pelvis away from the location of the contact foot. When both the raised and lowered feet move together in opposite directions the avatar's pelvic motion is controlled by a combination of these two translations.

$\Delta d$(Avatar Support Foot)=0

$\Delta d$(Avatar Swing Foot)=$S^*(\Delta d$(Raised Foot)–≠6d (Stroking Foot);)

$\Delta d$(Avatar Pelvis)=½$^*S^*(\Delta d$(Raised Foot)–$\Delta d$(Stroking Foot).)

Whether swinging or stroking, the avatar's pelvis (or more correctly its computational center of gravity) remains centered between the two virtual feet, in a similar manner to natural walking. This is the baseline treatment of the movement of the avatar pelvis. It may be desirable to vary the placement of the avatar's pelvis between the two feet depending on the avatar's stance. The avatar's stance is determined by two things: the posture of its upper body and the absolute position of the user's feet. The posture of the avatar's upper body directly matches the actual posture of the user's upper body. The absolute placement of the user's feet can be used to distinguish between whether half steps versus full steps are expressed, by noting the displacement of the feet from beneath the nominal position of the knees (a thigh length in front of the seated user's hips). Full steps are taken if the feet swing and stroke symmetrically to either side (front to back) of the nominal knee position. Half steps are taken when a foot extends out from the nominal knee position and is then drawn back under it. The avatar's pelvis always falls between the two feet in any static posture, so the movement of the avatar pelvis is ultimately constrained by the virtual locations of the avatar's two feet.

Motion of the physical feet towards-and-away from the seated user is scaled, preferably by a factor of 2× or some other factor as may be selected according to one's preferred mode of operation, to determine the motion of the virtual feet. The reason for this is as follows: Only the lower part of the user's leg is free to swing towards-and-away from a seated user, yet it is being used to indicate the motion of the avatar's entire leg as it swings during walking or running. Side-to-side foot motion is preferably scaled by a factor of about 1×. The seated user can extend the upper leg to the side along with the lower leg to obtain a lateral swing comparable to that which can be obtained when standing. Diagonal motion contains components of both towards-and-away and side-to-side motion, and the components are scaled-as described above before being added as a vector sum. Scaling the side-to-side motion of the feet by a factor of 1× gives the avatar a more natural looking stance (than with a scale factor of 2×). The equations can be generalized to:

$\Delta d$(Avatar Support Foot)=0

$\Delta d$(Avatar Swing Foot)=$S^*(\Delta d$(Raised Foot)–$\Delta d$ (Stroking Foot))

$\Delta d$(Avatar Pelvis)=$S^*((1-p)^*\Delta d$(Raised Foot)–$p^*\Delta d$ (Stroking Foot))

The proportion "p" indicates how much of the movement of the pelvis is due to the stroking portion of foot movement. If all of the motion of the pelvis occurs due to the stroke then p=1. The symmetrical versions given previously applies p=½.

Two different forms of natural turning will be simulated: stepping-to-turn and two-footed pivots: In stepping-to-turn a person lifts one foot up and then twists the ankle of the supporting foot to turn the body in the desired direction before setting down the raised foot. This action may be repeated several times to turn the body the desired amount. A person may step-to-turn while advancing the body in a particular (body relative) direction, or the person may step-to-turn in place; both of these cases are covered by the simulation. By far the most common means of turning the body during natural locomotion involves stepping-to-turn; this is normally how people walk in a curved path. To perform a two-footed pivot a person turns his pelvis to a new direction while both feet remain in place on the ground.

The seated control action for stepping to turn is performed with one foot raised and the other foot in contact with the floor. The virtual locomotion control system notes how the contact foot rotates about a vertical axis, and then turns the avatar's pelvis in the opposite direction by a proportional amount. The rotation of the foot is scaled by a factor R to determine the rotation of the avatar's body, but R is typically set to 1×, so the avatar body rotates the same amount as the twisting foot. If neither foot translates while the stroking foot twists, the avatar steps-to-turn in place. If either the stroking or swinging foot translates while the stroking foot twists then the avatar executes a step-to-turn while advancing the body. Rotation occurs about the avatar's support foot. The user can turn his avatar over a large angle by repeatedly twisting, raising and reorienting the stroking foot while alternately raising and lowering the other foot back onto the floor.

$\Delta a$(Avatar Support Foot)=0

$\Delta a$(Avatar Swing Foot)=$R^*(\Delta a$(Raised Foot)–$\Delta a$ (Stroking Foot))

$\Delta a$ (Avatar Pelvis)=–$R^*\Delta a$(Stroking Foot)

$\Delta a$ (segment) represents an angular rotation (about a vertical axis) of the part of the user's physical or avatar body included between the parenthesis. R represents a scale factor that scales the rotation of the user's foot movement to the rotation of the avatar's foot. R may vary with user to factor in the range of turning of one's ankle.

An alternate mapping that more closely resembles that applied to translation of the feet and pelvis is given below.

$\Delta a$(Avatar Support Foot)=0

$\Delta a$(Avatar Swing Foot)=$R^*(\Delta a$(Raised Foot)–$\Delta a$ (Stroking Foot))

$\Delta a$(Avatar Pelvis)=½$^*R^*(\Delta a$(Raised Foot)–$\Delta a$(Stroking Foot))

This set of equations involving rotations distributes the turning of the avatar's feet and pelvis more evenly over the course of the twisting swing and stroke of the feet.

These two forms of turning are analogous to varying the placement of the pelvis between the two feet for translation. The rotation of the torso is constrained to fall between the rotations of the avatar's two feet.

The equations can be generalized to:

$\Delta a$ (Avatar Support Foot)=0

$\Delta a$(Avatar Swing Foot)=$R^*(\Delta a$(Raised Foot)–$\Delta a$ (Stroking Foot))

$\Delta a$(Avatar Pelvis)=$R^*((1-q)^*\Delta a$(Raised Foot)–$q^*$ $\Delta a$(Stroking Foot))

The proportion "q" indicates how much of the movement of the pelvis is due to the stroking portion of foot movement. If all of the motion of the pelvis occurs due to the stroke than q=1. The second versions given above applies q=½.

Figure 3:
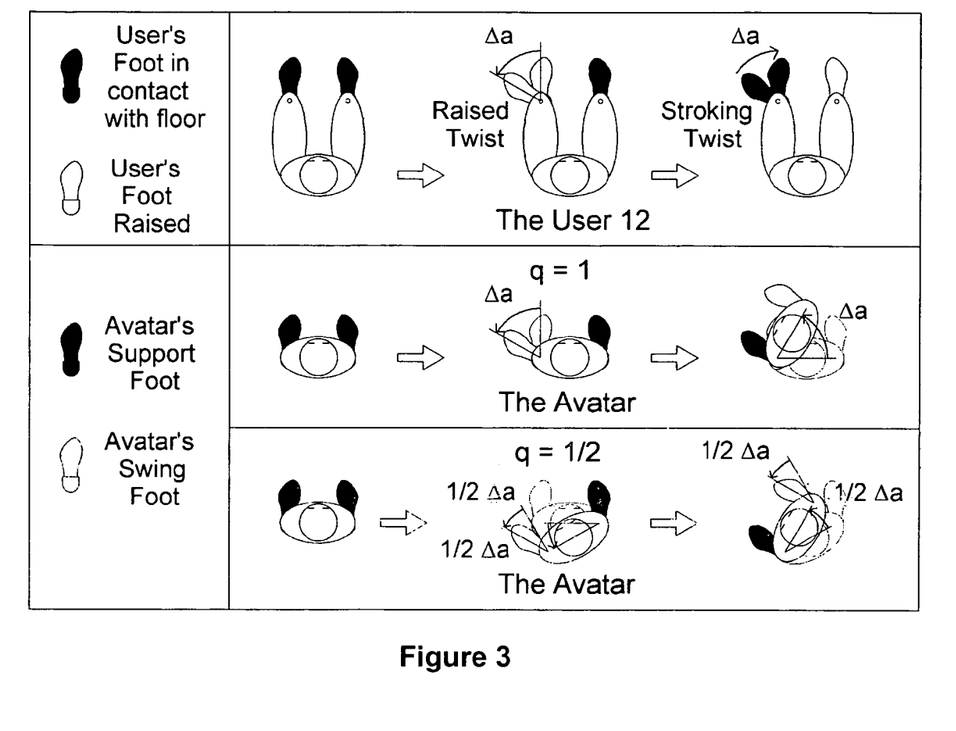
FIG. 3 is a schematic representation of a turning motion of a user avatar corresponding to foot control gestures according to the invention.

Referring now to FIG. 3, which illustrates the control actions and effects involved with turning, the user 12 first raises and twists the left foot 60 degrees counterclockwise and then stroke twists it back 60 degrees clockwise. The avatar is shown for two different values of q. With q=1, all of the turning of the avatar pelvis takes place entirely during the stroking twist. With q=½, the avatar pelvis turns half of the way during the raised twist, and the rest of the way during the stroking twist. In all cases illustrated R, the rotational scale factor, is 1×. Notice that with q=1: (A) During the raised twist of the user's foot: all (q $\Delta$a) of the rotation of the avatar's swing foot is made relative to the avatar's pelvis. (B) During the stroking twist of the user's foot: all (q $\Delta$a) of the rotation of the avatar's swing foot occurs by having the avatar's swing foot turn along with the avatar's pelvis. With q=½: (A) During the raised twist of the user's foot: half ((1−q)$\Delta$a) of the rotation of the avatar's swing foot occurs by having the avatar's swing foot turn along with its pelvis and the remaining (q $\Delta$a) rotation is made relative (in addition) to the rotation of the avatar's pelvis. (B) During the stroking twist of the user's foot: half (q $\Delta$a) of the rotation of the avatar's swing foot occurs by having it turn along with its pelvis and the remaining ((1−q)$\Delta$a) rotation is made relative (in addition) to the avatar's pelvis.

The control action for two-footed pivots is performed with both feet in contact with the floor. The virtual locomotion control system notes how the relative positional alignment between the feet changes as one or both feet stroke, then rotates the avatar's pelvis in the opposite direction by a matching amount to maintain the relative positional alignment between the feet and the pelvis.

The Lazy Foot Technique: Up until this point the control action involved the user 12 lifting one foot while stroking the other foot to translate and/or rotate the avatar. This has the advantage of closely mimicking the alternating swing and support roles of the legs during natural human gait. The operation of having at least one foot raised when executing a virtual pace can optionally be removed to make the control less demanding, at the cost of losing this detailed correspondence between the control action and natural stepping. This control action can be generalized to allow the avatar to move in response to the user stroking one foot, regardless of whether or not the other foot is raised. If a foot is stationary, it contributes no action to move the avatar's feet or pelvis. Thus treating a stationary lowered foot as if it were raised does not require any change in the equations of either translation or rotation given earlier. When the lazy foot technique is in effect, two footed pivots are either entirely disabled or limited to occur when both feet stroke over the floor at the same time.

All of these stepping and turning techniques maintain a direct correspondence between the relative 2D placement and orientation of the user's physical feet and pelvis and that of the avatar's feet and pelvis.

This approach to remapping the user's foot motions allows the user to express a wide range of stepping actions including stepping in any direction while the pelvis remains oriented in the same direction, turning in place by stepping or pivoting on both feet, and walking or running along a straight or curved path. The correspondence between the user's physical foot movements and the leg motion of his avatar allows a wide range of control actions to be automatically translated into actions performed by the avatar to move in the desired manner.

This set of control actions can be adapted for use with a swivel chair: where the seat 32 turns freely about its center but the chair does not translate. In that case the user turns the pelvis of his avatar by using his legs to physically turn around in the chair. Forces applied by the user's legs turn the seat. The user may then raise and reposition his feet to continue turning or gesture with his feet. Stroking a foot radially, towards or away from the center of the chair is used as before as a control gesture to translate the avatar forward and backward. It is difficult when sitting on a swivel chair, however, to stroke sideways with one foot when the other foot is raised. The rotational force applied by such an attempted stroke may turn the seat 32 while the foot in contact with the floor remains in place. The gesture for moving to the side is adapted to deal with this situation: to move the avatar to the side, one foot strokes sideways while the other foot remains stationary in contact with the floor. Unlike the "lazy foot technique" described earlier, the none stroking foot must remain in contact with the floor to translate the avatar, rather than allowing the non-stroking foot to be optionally raised or lowered.

Some users may have only a limited ability to twist their feet while seated. In that case alternative gestures are provided for making the avatar step to turn. One alternative is to treat the raised and stroking movement of the feet to the side as indicating a turn if the other foot is raised, and as indicating a translation to the side if the other foot is lowered. (This is similar to the control actions described for use with swivel chairs, but here those gestures are made on a chair with a fixed seat, so that the foot strokes sideways across the floor, rather than applying a force that turns the seat 32 when the other foot is raised.)

Virtual locomotion is typically used to control motion of the user's viewpoint through virtual or remote environments such as with the avatar. Up to this point the focus has been on the movement of the pelvis through the VE. The system could be used to control only the movement of a viewpoint or a body part that bears a fixed geometric relationship to the motion of the pelvis, but that is a limited use of the system. A more complete and natural range of motion control can be achieved by sensing and applying the movement of body parts that normally contribute to these additional motions. For this invention, these can include any body parts above the waist.

It is desirable to track the motion of the user's head and include this as another component of motion to give the user a greater degree of control over the position (vertical and horizontal) and orientation (yaw, pitch, roll) of the view. This provides the user natural control over the view. This is achieved computationally in a VE rendering system, but would require a remotely controlled camera positioning mechanism or the equivalent to achieve a similar effect in a tele-operated vehicle.

The direction, extent, and rate of translation and rotation of the user's avatar is controlled by the corresponding direction, extent, and rate of the user's foot motion as they swing and stroke over the floor. This transfers the cadence and displacement expressed by swinging and stroking the user's feet to the avatar's motion. The system determines whether each foot is in contact with the floor or lifted above it, then applies the rules previously stated to map the motion of the user's physical feet into the motion of the avatar's feet and pelvis. The positions of the avatar's upper and lower legs are derived from the orientation of the avatar's feet and the pose of its pelvis over the course of the motion. This controls the motion of the avatar's lower body (i.e., pelvis, legs, and feet). The head, and arms of the user's upper body are tracked and mapped directly into the motion of the user's avatar. (The torso may also be tracked, but this is not essential because the position of the head may be used to estimate the approximate orientation of the torso of a seated user.) The avatar's upper body remains attached to its lower body and thus follows its lower body as it translates and rotates in VE.

An analogy can be made between the way a person swings and put weight on their feet as the walk on a treadmill, with the way a person using the invention swings and strokes their feet across the floor. Whereas a conventional treadmill only allows a person to walk in one direction, the invention affords a "virtual treadmill" that moves underfoot in any direction and rotates as well. The existence of such a physically realizable model of action ensures that the set of control actions will be consistent amongst themselves, and the user's natural ability to manipulate a surface should carry over to his ability to readily control locomotion through VE using these techniques.

The force sensors 20 and force detector 22 allow the computer 14 to determine if a foot is raised or in contact with the floor. The position trackers 16 and position detector 18 allow the computer to determine when and how far each foot is translated and rotated. A foot strokes when it moves in contact with the floor. A foot swings when it moves when raised above the floor.

As discussed above, force sensors 20 are preferably variable resistors attached under the ball and heel sections of an insole shoe insert to measure the distribution of force under both feet. A force threshold was set, on an individual user basis, to determine when contact is made between the foot and the floor. Obviously, other force sensors could also be used for sensing these events, and other means could be employed for detecting when parts of the foot make and break contact with the floor.

It will be appreciated that in natural locomotion paces are typically taken in series and not as a single unit. As a result, a pace is typically defined in terms of one leg swinging from a position extending behind a user to its extension in front of the user. However, when a user starts walking from rest with both feet together, and stops by bringing both feet together, the initial and terminating paces are actually half-paces. Thus, computer 14 should also recognize such initial and terminal paces and apply this to the virtual displacement in the virtual environment Computer 14 can thus convert any gestural pace in any direction by detecting the movements of the feet.

The horizontal motion of a foot measured during a gestural translational stroke or swing is less than the swing of the foot which would occur during a physical pace. Therefore, computer 14 preferably computes the extent of motion in the virtual environment as a multiple of the horizontal motion detected. A ratio (S) of two times the distance of the translational stroke or swing is one preferred multiple used for the extent of forward motion of the virtual pace for advancing forward or backward. However, this ratio could be altered as desired, for example for different styles of gait and individual differences, as well as to simulate stairs, grades/inclines, and various types of terrain. The direction of motion detected is the actual motion of the foot of user 12, so that computer 14 passes the direction component directly to the virtual pace.

During a physical running gait there is a short period of time during which both feet are airborne. That distinguishes a running gait from a walking gait in natural human locomotion. In simulating running, by alternately stroking and swinging each foot a rate of foot motion is reached at which both feet are simultaneously raised. Thus the control motion experiences a transition in gestural gait that resembles that which occurs during the transition from walking to running in natural human locomotion.

In the preferred embodiment, the head is tracked with a position tracker 24 and position detector 18 to determine the physical position and orientation of the user's head. Other body segments are also preferably tracked, including the pelvis with a position tracker 26, upper torso, shoulders, arms and even fingers to allow their motion to directly control the corresponding parts of the avatar's upper body. To minimize viewing lag, the virtual displacement computed from gestural pacing is combined with the sensed position at the head to generate the virtual reference position in the virtual environment. Head tracker 24 enables the viewpoint to move independently, yet remain linked to the avatar's body position. Since the avatar's head and body share the same virtual displacement, they remain attached and move as linked segments of the avatar as it moves through the virtual environment. The virtual position and orientation of the body as determined by foot position trackers 16 and other body segment position trackers 26 can be used to control the corresponding body segments of the avatar (or remotely operated vehicle). A position tracker 30 mounted on the lower arm is also used where it is desired to track the movement and pointing of the lower arm. A position tracker 28 mounted on a rifle prop is also used where it is desired to track the movement and pointing of the rifle prop.

A head position tracker 24 can be used to track a head mounted display, such as a V8 model from Virtual Research Corporation which thus provides the point of view in a virtual environment. However, another feasible approach is to use a surround screen display for user 12. In fact this virtual locomotion control can be used with a single display of any size.

Virtual locomotion is most simply used to control motion of the view point of user 12 through a virtual (or remotely sensed) environment, but the virtual locomotion of the present invention can also be used to control the animation of an articulated representation of a user's virtual or remote "body". Thus, while the present invention has been primarily focused on the movement of the pelvis, it could be used only for the viewpoint or more expansively to the movement of various body parts.

As discussed above, apparatus 10 can also be used to remotely control the locomotion of a vehicle, robot, UAV, or other device in a real, physical environment. A controller 34 can be provided for remotely controlling the vehicle locomotion, which in lieu of the avatar control in a VE system instead computes based on the above foot-based controls and logic a corresponding desired locomotion of a controlled device such as a vehicle in its physical environment.

With the present invention, it will thus be appreciated that many realistic features are achieved by the use of foot motion to control action as follows:

Compared to a VE system that requires a user to stand, turn, and walk-in-place, where the user may be holding a rifle prop and may lean (with the area swept out by the motion of the user and the rifle prop being on the order of a ten foot diameter circle), the present invention with the user seated and turning 180 degrees rather than a full 360 degrees provides for a reduced footprint and training station size of about fifty percent or more. Having the user seated also reduces the vertical extent of the space that needs to be tracked, further decreasing the system's footprint and overall size because the tracking or position sensors can be positioned within a more confined space. At the same time, the present invention provides facile, natural control over both turning and translating through a virtual environment (VE).

The invention also provides many of the characteristics of natural locomotion and manipulation with a more direct means of expressing motion. A user can readily control his avatar to virtually walk and run around, and is free to turn the head to look in any direction and to use the hands to manipulate and point at virtual objects. The system is very responsive, and allows a user to move over a normal range of translational and rotational locomotion rates without difficulty.

The invention exhibits advantages over simpler foot based controls that rely on controlling the direction of motion via the orientation of the head, a hand, or a steering device rather than the motion of the feet to control turning and the translational direction of locomotion. Tracking the reciprocating motion of the legs as they translate and rotate relative to each other corresponds very closely to natural gait. The rate of motion and turning is not tied to a static position of a device or a part of the user's body. Instead changes in the position and orientation of the users avatar are tied to the motion (changes in the position and orientation) of the user's feet. This is termed motion-driven control because the motion of physical elements drive the motion of the (virtual) unit being controlled. Translational motion is achieved by translating either foot when one or both of them are raised. The rate of motion is proportional to the rate at which the feet are moved. Likewise, turning is achieved by rotating either one foot in contact with the floor while the other foot is raised, twisting a raised foot, or rotating one foot relative to the other when both are in contact with the floor. The rate of turning thus corresponds to the rate at which the feet rotate. This corresponds much more closely to the way people control their motion when walking and running. This motion-driven approach produces a number of additional advantages, including open loop control, virtual motion in any direction, and a body relative coordinate system. Whereas a closed loop control requires the user to observe something outside of himself to know how far he has moved, an open loop control does not require the user to observe something external to know how far he has moved. He can gauge the extent of the movement based on his own actions, at least when moving over a short range. Natural walking and turning are open loop controls: People are aware of how far they step or turn over short ranges and can judge how far they have come with their eyes closed. It is desirable for a simulated locomotion control to provide a similar level of open-loop control over translation and rotation. For a virtual locomotion control closed loop control means relying on the changing view of the virtual environment to determine how far he has come. Positional rate controls require closed-loop control, in which the rate of translation or turning is set and adjusted until the desired alignment is sensed. Motion-driven controls, where the motion of one element drives the motion of the (virtual) unit being controlled, can provide open loop control. With the invention this applies to both translation and rotation. The translation of the avatar is determined by how far the user moves his feet. The user has an internal sense of how far he moves his feet so he knows how far his avatar goes as he executes the movement, without having to rely on visual feedback to discover how far they have traveled. The rate, extent, and direction of the avatar's translational motion is directly controlled by the corresponding rate, extent, and direction of motion of the feet. Thus translation is performed using an open loop control. This is like natural walking where a person has an internal sense and control over how far he moves even when his eyes are closed for a short period of time. Likewise since rotation is controlled via the turning of one foot or of the two feet with respect to each other, rotation is performed using an open loop control. The rate, extent, and direction of the avatar's rotational motion is directly controlled by the corresponding rate, extent, and direction of turning of one foot, or of the two feet with respect to each other.

The user can take virtual steps in any direction relative to their body by either swinging a raised foot in that direction or stroking a foot in contact with the floor in the opposite direction with the other foot raised. They can move forward, backward, sideways, or diagonally without turning their body. It allows the user to move in a direction other than where the user's torso, pelvis, or knees are pointed.

The invention does not unnaturally constrain or interfere with actions performed by other parts of the body. It frees the head for looking, the hands for manipulation, and the torso for bending and twisting. It also allows for naturally coordinated actions involving locomotion (e.g., visually scanning while walking around). The motions are easy for a user to make with confidence. The gesture for walking forward is particularly easy: alternately swinging one foot forward while stroking the other foot backward in contact with the floor. The alignment (relative position and orientation) of the user's avatar feet corresponds to the alignment between the physical feet. This allows the user to directly control the positioning of the avatar's feet. Few virtual locomotion controls give the user control over their foot placement as well as control over the overall movement of their avatar. The virtual feet move in sync with the actions of the physical feet. The virtual feet move on and over the virtual ground as the physical feet move on and over the "virtual treadmill". This correspondence gives the user control over the location of his foot-falls when taking virtual steps and thus would allow him to walk his avatar over a series of stepping stones. The user also controls the vertical positioning of his avatar's feet to do things like step over obstacles, point at virtual objects with his feet, and kick or otherwise manipulate virtual objects with his feet.

This correspondence also increases the postural similarity between the user's physical and avatar feet, thus extending the body relative frame of motion to include a foot relative frame of motion. The user's proprioceptive sense of how his feet are aligned will match how his avatar's feet are aligned. This in turn makes translational and rotational control more natural because the way the physical feet translate and rotate correspond closely to how the user would execute such motions when standing and actually moving about, which is portrayed in his avatar's movements. It reinforces the user's sense of alignment with his avatar. The advantage of expressing motion in a body relative coordinate system is that, since the direction of foot movement with respect to the environment determines the direction of virtual motion, other parts of the body (head, shoulders, arms, pelvis, etc.) can be aligned as they are in natural postures and movements. This allows a user to make use of natural reflexives to direct the feet and body in response to external stimuli. Conversely, if motion were linked to an external reference like a table mounted joystick or the direction of motion of a treadmill belt the user may lose awareness of its precise orientation, especially when viewing the virtual environment via a head-mounted display. When this happens the user may attempt to steer his motion straight ahead of where his body is oriented, yet the control will move straight ahead relative to the external reference system and the user will experience himself veering somewhat off course. A user can control more than just the direction and speed of motion in VE. A user can control the gait of their bodily representation in VE. The following set of variables characterize both seated strokes and actual steps: the timing with which foot motions are made, the distance and speed at which the feet move relative to one another, and the phasing of foot contact made during successive steps. All these variables can allow the user to control the characteristics of virtual locomotion. The attributes of seated stroking can be applied to control the characteristics of natural gait portrayed by the virtual locomotion (e.g., greater foot displacement maps into longer strides, and a higher frequency of stroking maps into a higher cadence.) This contributes to the naturalness of the interactive control (as compared to systems that link speed to a single variable, like the height of the foot above the floor). Foot motion is scaled and mapped into virtual displacement. This makes it possible to tune the system to match particular attributes of natural locomotion (e.g., perceived velocity, natural cadence, effort exerted, etc.). The ability to simultaneously control the direction, extent, and rate of both translation and turning in an open loop manner over the course of a single stroke is very powerful. This ability can be applied to execute martial arts, sports, and dance moves.

The invention provides a high level of consistency between the user's actions and effects because it maintains a direct link between the movements of the physical feet swinging and stroking across the floor in correspondence with the motion of the feet during the swing and support phases of actual walking. Thus it is straightforward to map the user's physical foot movements to the motion of the avatars virtual feet. The proportional separation between the feet, the relative motion of the feet and the pelvis, whether a foot is in contact with the floor or raised above it, and the relative alignment between the feet with each other are all maintained between the physical and virtual feet. This consistency is echoed by the analogy with a treadmill, which illustrates how the cyclic movement of the feet within a localized area (walking on a treadmill) mirrors natural locomotion.

The seated user can move both feet simultaneously during the course of a simulated step. The stroking cycle can be repeated akin to the way the legs naturally take turns at alternately swinging and supporting (while propelling) the body during natural locomotion. This allows the system to match the phasing of natural walking and running gaits in terms of when the user lifts and extends his legs to take a pace. This makes it feel more like natural stepping in terms of the timing and coordination of foot movement and contact with the floor. It also makes it straightforward to link the user's foot movements to the avatar's foot movements in a naturalistic manner, in addition to controlling the overall motion of the avatar.

The two-footed approach offers additional freedom of control. It provides two means of advancing the lead foot and body: swinging one foot or stroking the other. If the swing foot does not reach the desired destination, stroking the other foot provides an additional boost in range. This is useful for walking over simulated stepping stones, for example. Moving both feet simultaneously also allows a relatively small scaling factor, providing the user finer control over motion.

As the user's feet swing and stroke across the floor, the avatar responds immediately and advances. That is, the avatar does not wait for a gesture to be complete before responding to foot movements. In fact, since all foot motions can be interpreted as control actions, the system does not have to wait before it is able to discriminate between physical and virtual (gestural) steps. Tying the avatar's motion directly to foot motion, without breaking up the motion into discrete "quantum" gestures provides a more immediate and continuous control over motion. The user can stop or redirect his avatar's motion at any time without having to wait for one gesture (swing or stroke) to complete before another gesture can begin. Discretely defined gestures force the user to advance by bounds. The control actions applied in this invention are immediately reversible, by moving the feet back in the opposite direction. A highly responsive control is critically important for moving in confined spaces, close to other objects and surfaces, and is required for a person to quickly take cover in a close-quarter combat training system, which the invention provides.

It is important to provide a highly controllable means of turning in order to substitute gestural turning for physical turning. The invention simulates two different forms of turning (stepping-to-turn and turning the pelvis with respect to the feet) using two different control gestures (one and two footed gestures). Both methods of turning are executed on a one-for-one basis (i.e., typically with a rotational scale factor R of 1×). This makes it easier for the user to coordinate the turning of the upper body (e.g., turning the head or pointing a rifle) with the gestural turning of the avatar. Both methods of turning are open loop controls. The user may control the angular extent of the turn with the eyes closed. Even when the user's eyes are open the user can turn by a desired amount without having to pay undue attention to the scene moving past him.

Since the user does not physically turn the body, the HMD, tracking sensors, and other electrical devices attached to or held by the user can be wired directly to the controlling computer 14. A physical harness, slip rings, or wireless transmission is not required to allow the user to turn freely and move about. Since the user does not physically turn around the invention is compatible with room mounted display screens placed in front of the user as well as head-mounted displays.

The equipment used to implement the virtual locomotion control is compact and relatively inexpensive compared with mechanical motion platforms. A yet lower cost version of the invention can be implemented with sensors that detect movement along a surface (as a computer mouse does), such as to just use the stroking motions of the feet to move the avatar's entire body around in VE. The merit of doing so is that full control over the avatar's overall motion can be attained by only paying attention to the movement of the feet when they are in contact with the floor. This reduces the tracking requirement to just the relative 2D displacement ($\Delta x$, $\Delta y$) and rotational ($\Delta yaw$) of foot movement. Thus a simpler tracking technology can be used. A system using the same basic elements used in a computer mouse input device could be used for this purpose. This alternative, however, provides a more limited functionality: Although it can be used to control the overall motion of the avatar, it cannot control the precise positioning of the avatar's feet (because the location of a raised foot is not tracked in this limited implementation). It can be implemented at less cost and in a compact package. This combined with its resemblance to the fully functional system is likely to make it appeal to a large consumer base, especially among video-game enthusiasts.

Another alternative embodiment is to track the position and orientation of the lower leg and foot as a semi-rigid object. If the ankle is tracked, i.e. the position trackers 16 are located on the ankle rather than lower down on the foot proper, the location and orientation of the foot can be determined. Alternatively, the translational and rotational velocity or acceleration of the foot can be tracked, and this information can be combined with initial (or infrequently sampled) conditions to derive the foot's pose.

The translational scale factor described above may be modified as desired so as to map forward-and-back motion of the feet to achieve different effects. For example, one could employ for simulated walking a user-specific and therefore more precise scale factor, such as the length of the particular user's entire leg from the center of the hip joint to the sole of the foot divided by the length of the lower leg measured from the center of the knee joint to the sole of the foot. This varies according to the body proportions of different users.

The outputs of the force sensors 20 could further be utilized to allow the user to indicate how forcefully he is leaning, pushing, or pulling on virtual objects or to indicate a greater exertion applied in propelling himself forward or climbing. Other types and/or differently positioned sets of sensors can be used to track the position and orientation of the feet and determine when the user's feet (or foot wear) makes contact with the floor. For example, position tracking and ground reaction forces could be measured by sensors mounted on the surface of the floor, rather than attaching sensors to the person using the control. Other means are available for measuring the forces underfoot including force sensor mounted to a person's foot, to their shoe, to sandals worn under their shoes, or to the floor. There are also many different ways to detect when a foot is in contact with the floor or raised above it. Contact of the foot can be detected by measuring the distance between various parts of the foot with the ground plane. Contact of a part of the foot with the floor can be detected by tracking the position of the foot (or shoe) to determine when its distance from the floor becomes negligible. Many different measuring devices can be used to measure the foot's (or shoe's) distance from the floor. Alternatively, the contact of part of the foot (or shoe) with the floor can be determined by measuring the forces exerted on one by the other, or by measuring some other physical property associated with contact, such as a difference in the transfer of various forms of energy propagating across the floor, body, or footwear (e.g., the capacitance between the sole of the shoe and the floor, the resistance between sets of exposed electrical contacts on either the shoe or floor, the transmission of sound or electrical potential between the floor and the body or wearable items varies with contact, etc.).

As discussed above, preferably the system will track the three dimensional position of both feet over time, in terms of six degrees of freedom: three translational coordinates (x, y, z) and three orientation angles (yaw, pitch, roll). This provides useful data for driving the 6-DoF motion of the user's avatar's legs and pelvis through the virtual environment. Typically limb segments are tracked, including the feet, in terms of all six degrees-of-freedom rigid objects posses: position in x, y, z coordinates and orientation in yaw, pitch, and roll. The invention can also be implemented when tracking each foot with only four degrees-of-freedom: their position in x, y, z coordinates and their yaw orientation. A somewhat more restrictive version of the system can get by with only three degrees-of-freedom: their position in x, y and their yaw, so long as the system includes the capability to sense when the feet contact the floor. The system can produce a full range of motion control over the surface of a virtual terrain if it can detect the horizontal position of each foot, the rotation of each foot projected into the ground plane (yaw), and when the feet are in contact with the floor. A more limited version of this control could be provided if the system only tracks the relative motion (delta-x, delta-y, delta-yaw) of each foot when in contact with the floor. The motion of the avatar would be driven directly by the stroking (translation & rotation) of the feet, and the 3D motion of the avatar's feet could not be tied directly to the absolute position of the user's physical foot. Such a facility would provide an inexpensive means of adding a much more natural way of controlling locomotion to consumer grade computer and video games. It is also feasible to track only a single foot to control virtual locomotion, although some of its facility and naturalness could be lost. The foot would provide open-loop control over the direction, extent, and rate of translation and rotation, although possibly not in as smooth, continuous, or symmetrical a manner. If the z axis extends vertically, then the z coordinate of foot height is scaled by a factor, e.g. 2×, to determine the height of the avatar's corresponding foot.

There are many different ways of sensing the movement of the segments of a person's body. These include but are not limited to optical, acoustic, magnetic, inertial, and radio frequency sensing systems. Force sensors can be used to measure the forces between a person's foot wear and the floor when the two are in contact. Such force information can be used to detect contact and to provide indirect information about the motion of the feet in contact with the floor.

It should also be noted that the control gestures of the invention described above can be utilized in positions other then seated, including but not limited to kneeling, standing, and reclining.

Thus, while the present invention has been described with respect to exemplary embodiments thereof, it will be understood by those of ordinary skill in the art that variations and modifications can be effected within the scope and spirit of the invention.

What is claimed is:

1. An apparatus for interfacing movements of a user to control the locomotion of an avatar in a virtual environment, comprising:

a sensing system including
    a first position tracker for tracking a position of a first foot and having an output,
    a second position tracker for tracking a position of a second foot and having an output, and
at least one detector for receiving said outputs from said position trackers and thereby determining and generating an output representing a position and orientation of a user's foot;

a computer programmed for:
    computing a direction and extent of motion in the environment corresponding to the detector output;
    providing an avatar output for displaying the avatar in the virtual environment; and a display for displaying the avatar in the virtual environment, and wherein the computer programming includes equations governing the relation between actual movements of the first foot and the second foot and the movement of the avatar in the virtual environment, said equations comprising:

$\Delta d$(Avatar Support Foot)=0

$\Delta d$(Avatar Swing Foot)=$S^*(\Delta d$(Raised Foot)$-\Delta d$(Stroking Foot))

$\Delta d$(Avatar Pelvis)=$S^*((1-p)^*\Delta d$(Raised Foot)$-p^*\Delta d$(Stroking Foot))

where $\Delta d$ (segment) represents a displacement vector in the horizontal plane of motion for the part of the user's physical or avatar body included between the parenthesis, S represents a scale factor that may vary with direction, and p is a proportion indicating the extent of movement of the avatar's pelvis that is due to the stroking portion of foot movement;

$\Delta a$(Avatar Support Foot)=0

$\Delta a$(Avatar Swing Foot)=$R^*(\Delta a$(Raised Foot)$-\Delta a$(Stroking Foot))

$\Delta a$(Avatar Pelvis)=$R^*((1-q)^*\Delta a$(Raised Foot)$-q^*\Delta a$(Stroking Foot)), where Δa (segment) represents an angular rotation of the part of the user's physical or avatar body included between the parenthesis, R represents a scale factor that scales the rotation of the user's foot movement to the rotation of the avatar's foot, and q is a proportion indicating how much of the movement of the avatar's pelvis is due to the stroking portion of foot movement; and wherein a control action for two-footed pivots is performed with both feet in contact with the floor, whereby the relative positional alignment between the feet and the resulting changes is tracked as one or both feet stroke, thereby rotating the avatar's pelvis.

2. An apparatus as in claim 1, further comprising a first force sensor for measuring a contact force of the first foot and a second force sensor for measuring a contact force of the second foot, wherein the measured contact forces are included in the computation of the direction, timing and extent of motion of the avatar in the virtual environment.

3. An apparatus as in claim 1, wherein said at least one detector includes at least one active optical tracker or at least one passive optical tracker.

4. An apparatus as in claim 1, wherein said foot position trackers each comprises a light-emitting diode.

5. An apparatus as in claim 1, further comprising a head position tracker.

6. An apparatus as in claim 5, wherein said display is a head mounted display.

7. An apparatus as in claim 6, wherein said head position tracker is a sensor on said head mounted display.

8. An apparatus as in claim 1, further comprising a position tracker for tracking a position of a trunk portion of the user and having an output detectable by said at least one detector.

9. An apparatus for interfacing 3D movements of a user to control the locomotion of an avatar in a virtual environment, comprising:
   means for sensing a position of a first foot and a position of a second foot;
   means for sensing a ground contact force of the first foot and a ground contact force of the second foot;
   means for receiving outputs from said means for sensing said positions and said means for sensing said ground contact forces;
   computing means for:
      computing a direction and extent of motion in the environment corresponding to the outputs:
      providing an avatar corresponding to the computed direction and extent of motion; and
      providing an avatar output for displaying the avatar in the virtual environment; and
   display means for receiving the computer avatar output and displaying the avatar in the virtual environment, and wherein the computing means includes computer executable instructions stored therein including equations governing the relation between actual movements of the first foot and the second foot and the movement of the avatar in the virtual environment, said equations comprising:

$$\Delta d(\text{Avatar Support Foot})=0$$

$$\Delta d(\text{Avatar Swing Foot})=S^*(\Delta d(\text{Raised Foot})-\Delta d(\text{Stroking Foot}))$$

$$\Delta d(\text{Avatar Pelvis})=S^*((1-p)^*\Delta a(\text{Raised Foot})-p^*\Delta d(\text{Stroking Foot}))$$

where Δd (segment) represents a displacement vector in the horizontal plane of motion for the part of the user's physical or avatar body included between the parenthesis, S represents a scale factor that may vary with direction, and p is a proportion indicating the extent of movement of the avatar's that is due to the stroking portion of foot movement;

$$\Delta a(\text{Avatar Support Foot})=0$$

$$\Delta a(\text{Avatar Swing Foot})=R^*(\Delta a(\text{Raised Foot})-\Delta a(\text{Stroking Foot}))$$

$$\Delta a(\text{Avatar Pelvis})=R^*((1-q)^*\Delta a(\text{Raised Foot})-q^*\Delta a(\text{Stroking Foot})),$$

where Δa (segment) represents an angular rotation of the part of the user's physical or avatar body included between the parenthesis, R represents a scale factor that scales the rotation of the user's foot movement to the rotation of the avatar's foot, and q is a proportion indicating how much of the movement of the avatar's pelvis is due to the stroking portion of foot movement; and wherein a control action for two-footed pivots is performed with both feet in contact with the floor, whereby the relative positional alignment between the feet and the resulting changes is tracked as one or both feet stroke, thereby rotating the avatar's pelvis.

10. An apparatus as in claim 9, wherein said means for receiving sensor outputs includes optical trackers.

11. An apparatus as in claim 10, further comprising means for sensing a head position.

12. An apparatus as in claim 11, wherein a head position sensor is a component of said means for sensing a head position.

13. An apparatus as in claim 9, wherein said position sensing means includes means for sensing a pelvis position.

14. An apparatus for controlling the motion of a remote controlled vehicle in an operating environment, comprising:
   a position tracker for tracking the position of a first foot and a second foot, wherein said first and second foot positions each include swinging and stroking;
   a computer programmed for:
      computing a desired direction and extent of motion of the remote controlled vehicle in the vehicle operating environment corresponding to the detector output; and
      generating a corresponding control signal output for controlling a motion of a remote controlled vehicle;
   a controller; and
   a display for observing the motion of the remote controlled vehicle, and wherein the computer programming includes equations governing the relation between actual movements of the first foot and the second foot and the movement of the avatar in the virtual environment, said equations comprising:

$$\Delta d(\text{Avatar Support Foot})=0$$

$$\Delta d(\text{Avatar Swing Foot})=S^*(\Delta d(\text{Raised Foot})-\Delta d(\text{Stroking Foot}))$$

$$\Delta d(\text{Avatar Pelvis})=S^*((1-p)^*\Delta d(\text{Raised Foot})-p^*\Delta d(\text{Stroking Foot}))$$

where Δd (segment) represents a displacement vector in the horizontal plane of motion for the part of the user's physical or avatar body included between the parenthesis, S represents a scale factor that may vary with direction, and p is a proportion indicating the extent of movement of the avatar's pelvis that is due to the stroking portion of foot movement;

$$\Delta a(\text{Avatar Support Foot})=0$$

$$\Delta a(\text{Avatar Swing Foot})=R^*(\Delta a(\text{Raised Foot})-\Delta a(\text{Stroking Foot}))$$

$$\Delta a(\text{Avatar Pelvis})=R*((1-q)*\Delta a(\text{Raised Foot})-q*\Delta a \\ (\text{Stroking Foot})),$$

where Δa (segment) represents an angular rotation of the part of the user's physical or avatar body included between the parenthesis, R represents a scale factor that scales the rotation of the user's foot movement to the rotation of the avatar's foot, and q is a proportion indicating how much of the movement of the avatar's pelvis is due to the stroking portion of foot movement; and wherein a control action for two-footed pivots is performed with both feet in contact with the floor, whereby the relative positional alignment between the feet and the resulting changes is tracked as one or both feet stroke, thereby rotating the avatar's pelvis.

15. An apparatus as in claim 14, further comprising a force sensor for measuring a contact force of the first foot and the second foot, wherein the measured contact forces are included for computing the direction, timing and extent of motion of the avatar in the virtual environment.

16. An apparatus as in claim 14, further comprising a head position tracker.

17. An apparatus as in claim 16, wherein said display is a head mounted display.

18. An apparatus as in claim 17, wherein said head position tracker includes a sensor on said head mounted display.

19. An apparatus as in claim 14, further comprising a tracker associated with a trunk portion of the user.

20. A method for interfacing 3D movements of a user to control the locomotion of an avatar in a virtual environment, comprising:

sensing a position of a first foot, a position of a second foot, and a position of a trunk portion of a user;

sensing a ground contact force of the first foot and a ground contact force of the second foot;

receiving outputs of said positions and said ground contact forces in a computer;

computing a direction and extent of motion in the environment corresponding to said outputs;

generating an avatar corresponding to the computed direction and extent of motion; and displaying the avatar in the virtual environment; and wherein the computing includes applying equations governing the relation between actual movements of the first foot and the second foot and the movement of the avatar in the virtual environment, said equations comprising:

$$\Delta d(\text{Avatar Support Foot})=0$$

$$\Delta d(\text{Avatar Swing Foot})=S*(\Delta d(\text{Raised Foot})-\Delta d \\ (\text{Stroking Foot}))$$

$$\Delta d(\text{Avatar Pelvis})=S*((1-p)*\Delta d(\text{Raised Foot})-p*\Delta d \\ (\text{Stroking Foot}))$$

where Δd (segment) represents a displacement vector in the horizontal plane of motion for the part of the user's physical or avatar body included between the parenthesis, S represents a scale factor that may vary with direction, and p is a proportion indicating the extent of movement of the avatar's pelvis that is due to the stroking portion of foot movement;

$$\Delta a(\text{Avatar Support Foot})=0$$

$$\Delta a(\text{Avatar Swing Foot})=R*(\Delta a(\text{Raised Foot})-\Delta a \\ (\text{Stroking Foot}))$$

$$\Delta a(\text{Avatar Pelvis})=R*((1-q)*\Delta a(\text{Raised Foot})-q*\Delta a \\ (\text{Stroking Foot})),$$

where Δa (segment) represents an angular rotation of the part of the user's physical or avatar body included between the parenthesis, R represents a scale factor that scales the rotation of the user's foot movement to the rotation of the avatar's foot, and q is a proportion indicating how much of the movement of the avatar's pelvis is due to the stroking portion of foot movement; and wherein a control action for two-footed pivots is performed with both feet in contact with the floor, whereby the relative positional alignment between the feet and the resulting changes is tracked as one or both feet stroke, thereby rotating the avatar's pelvis.

21. The method of claim 20, wherein the user is in a seated position.

* * * * *